United States Patent
Boll et al.

(10) Patent No.: US 6,976,935 B2
(45) Date of Patent: Dec. 20, 2005

(54) METHOD AND APPARATUS FOR OPERATING A MOTOR VEHICLE

(75) Inventors: Bernhard Boll, Alling (DE); Mario Jung, Sinzheim (DE); Burkhard Pollack, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 121 days.

(21) Appl. No.: 10/616,901

(22) Filed: Jul. 10, 2003

(65) Prior Publication Data

US 2004/0142793 A1 Jul. 22, 2004

(30) Foreign Application Priority Data

Jul. 12, 2002 (DE) ......................................... 102 31 672

(51) Int. Cl.[7] .............................................. B60K 41/02
(52) U.S. Cl. ........................................ 477/77; 477/174
(58) Field of Search ............................. 477/77, 79, 83, 477/86, 181

(56) References Cited

U.S. PATENT DOCUMENTS

| | | | | |
|---|---|---|---|---|
| 3,845,674 A | * | 11/1974 | Hause | ......................... 477/126 |
| 5,588,515 A | * | 12/1996 | Toyama et al. | .............. 192/222 |
| 5,876,301 A | * | 3/1999 | Tabata et al. | ................ 477/109 |
| 6,023,647 A | * | 2/2000 | Saito et al. | .................... 701/57 |
| 6,190,286 B1 | * | 2/2001 | Ito et al. | ...................... 477/160 |
| 6,430,483 B2 | * | 8/2002 | Takaoka et al. | .............. 701/22 |
| 6,732,601 B2 | * | 5/2004 | Suzuki | ..................... 74/336 R |
| 2002/0049118 A1 | * | 4/2002 | Vornehm et al. | ............ 477/107 |
| 2002/0095248 A1 | * | 7/2002 | Katakura et al. | ............. 701/29 |
| 2003/0100401 A1 | * | 5/2003 | Kim | ........................... 477/107 |
| 2003/0150286 A1 | * | 8/2003 | Kayano et al. | ............... 74/339 |
| 2004/0014562 A1 | * | 1/2004 | Kresse et al. | ................ 477/107 |
| 2004/0014564 A1 | * | 1/2004 | Jager et al. | .................. 477/115 |

FOREIGN PATENT DOCUMENTS

| | | | | | |
|---|---|---|---|---|---|
| JP | 09256883 A | * | 9/1997 | ........... | F02D/29/00 |
| JP | 2000071816 A | * | 3/2000 | ........... | B60K/41/06 |

* cited by examiner

Primary Examiner—Tisha Lewis
(74) Attorney, Agent, or Firm—Alfred J. Mangels (57) ABSTRACT

A method and apparatus for transmitting a torque and for operating a motor vehicle having a drive motor with an automated or automatic transmission in the drive train. A driver-identifying lock recognition system, as well as a transmission control unit that includes a memory function for storing driver-related parameters, especially for improving driving comfort, are provided.

15 Claims, 5 Drawing Sheets

METHOD AND APPARATUS FOR OPERATING A MOTOR VEHICLE

BACKGROUND OF THE INVENTION

1. Field of the Invention

The invention relates to a method, an apparatus, and their utilization for operating a motor vehicle having a drive motor and an automated or automatic transmission in the drive train for transmitting torque, and a transmission control unit that includes a memory function, in particular to improve driving comfort.

2. Description of the Related Art

Methods for controlling and/or regulating an automated/automatic transmission are known. For example, a clutch arranged between a drive motor and a transmission in a drive train is increasingly actuated automatically, wherein an actuator that operates the clutch is controlled by a control device in accordance with the operating conditions of the motor vehicle. In that way, there is controlled or regulated an automated disengagement and reengagement of the clutch during a gear, an engagement at a startup procedure from a standing position, or a disengagement of the clutch at a braking procedure to a standing position. With those known processes, automation of the drive train of a motor vehicle is made possible. With a preset gear shifting strategy, it is possible to implement shifting processes during the driving operation of the motor vehicle, without the driver having to shift gears himself. Automatic or automated transmissions in motor vehicles normally shift in accordance with preset shifting programs, which allow the various parameters of the particular motor vehicle conditions and requirements of the driver to be included in the calculation of an appropriate speed ratio condition of the transmission.

In modern motor vehicles, means for communication among the individual components of the drive train are also available, for example in the form of a CAN bus or the like. However, those are used predominantly for the exchange of sensor data in a multiple utilization technique. Furthermore, by means of communication the control systems are influenced during certain processes, for example in order to retrieve driver-specific settings from electronic memories. Thus, at the push of a button, for example, different seating positions, steering wheel, head rest, climate control, and mirror positions can be retrieved by the system and can be implemented by corresponding control mechanisms. These days, in modern motor vehicles those special parameters are stored as data in the driver's key and in the motor vehicle's locking system, and can be linked together and compared by corresponding transmitting systems. Thus those key data provide a clear identification of a particular driver. Those functions are referred to as "Car Memory" or "Key-less Go."

In the area of transmission control, so-called adaptive transmission control systems exist, in which the special driving style of the driver, for example the position of the accelerator pedal or the adjustment gradients of the accelerator pedal position, is read-in and programmed in by a series of factors. Following an evaluation process, the corresponding shift characteristics and shift processes are adjusted to those factors. Thus it is possible, for example, to make a selection in terms of both shift characteristics and shift processes between a sporty setting and a more economical setting for the driving style.

Furthermore, it has been found that in particular through a basic interruption in tractive force, such as occurs, for example, with a normal manual transmission, there can result jerking movements or pitching movements of the motor vehicle, which the driver experiences as unpleasant.

The objects of the invention relate, in a motor vehicle with an automatic transmission, to
- avoiding the engine racing when the clutch is engaged after an R-D shift,
- making the identification parameters of the driver available to the transmission control system, and
- increasing driving comfort during shifting and clutch disengagement processes.

SUMMARY OF THE INVENTION

In accordance with the invention, that object is attained in that before a shift of gears by means of the transmission actuator takes place, a torque engagement of engine torque takes place, which reduces it enough so that the engine cannot race. In that way, an excessive rotational speed difference between the engine and the transmission is prevented, and driving comfort is thus optimized sufficiently so that the jerking that occurs during clutch engagement is prevented or is significantly reduced.

One advantageous embodiment of the invention provides for the use of the memory function of the transmission control unit, or of the driver identifying locking system, for balancing relevant adaptation parameters and to combine them.

In that way, communication with the transmission control unit is expanded in an advantageous manner by an additional signal, which serves to identify the particular driver.

The linkage of the memory function of the transmission control unit with the lock system recognition, which can be accomplished advantageously over the CAN bus of the motor vehicle, enables an increase in the multitude of variations in terms of driving style and convenience, thus increasing driving comfort.

It is also advantageous to receive the driver identification from a control unit of the lock system or the seat adjustment only after completion of the boot process for the transmission control unit. In keeping with the received values, adaptation parameters for the shift programs are then loaded in as inputs.

The linking of the signals from the control units can take place over the motor vehicle's CAN bus.

One advantageous embodiment of the invention provides for a corresponding signal, that has been adjusted in accordance with the situation to the control of the active chassis, to be emitted in a timely manner, such that during the engagement/disengagement of the clutch and the shift process a level control of the chassis takes place simultaneously as a function of those processes.

Also of advantage is that the data in the actuators for level control are detected in the control unit for the level control of the chassis and are correlated with the transmission control system. In that manner, the pitching angle, which results from the difference in the regulating distances of the actuators or shock absorbers for the front wheels and the regulating distances of the rear wheels or their axles, divided by the wheel spacing between the front and rear wheels, can be actively influenced or compensated for in case of an interruption in tractive force.

In an advantageous manner, the level control of the chassis takes place as a function of the engagement/disengagement of the clutch and the shift process. To that end, actuators are provided in at least the forward and/or rear axle of the motor vehicle, and either are oriented parallel to the respective shock absorbers of the chassis, or are a component of the shock absorbers.

Furthermore, it is advantageous that the regulating distances of the actuators for at least one axle can be equal during regulation, or can be regulated individually for each wheel.

BRIEF DESCRIPTION OF THE DRAWINGS

The invention will be described in greater detail below with reference to an exemplary embodiment, together with the accompanying drawings, in which.

DESCRIPTION OF THE PREFERRED EMBODIMENTS

Figure 1:
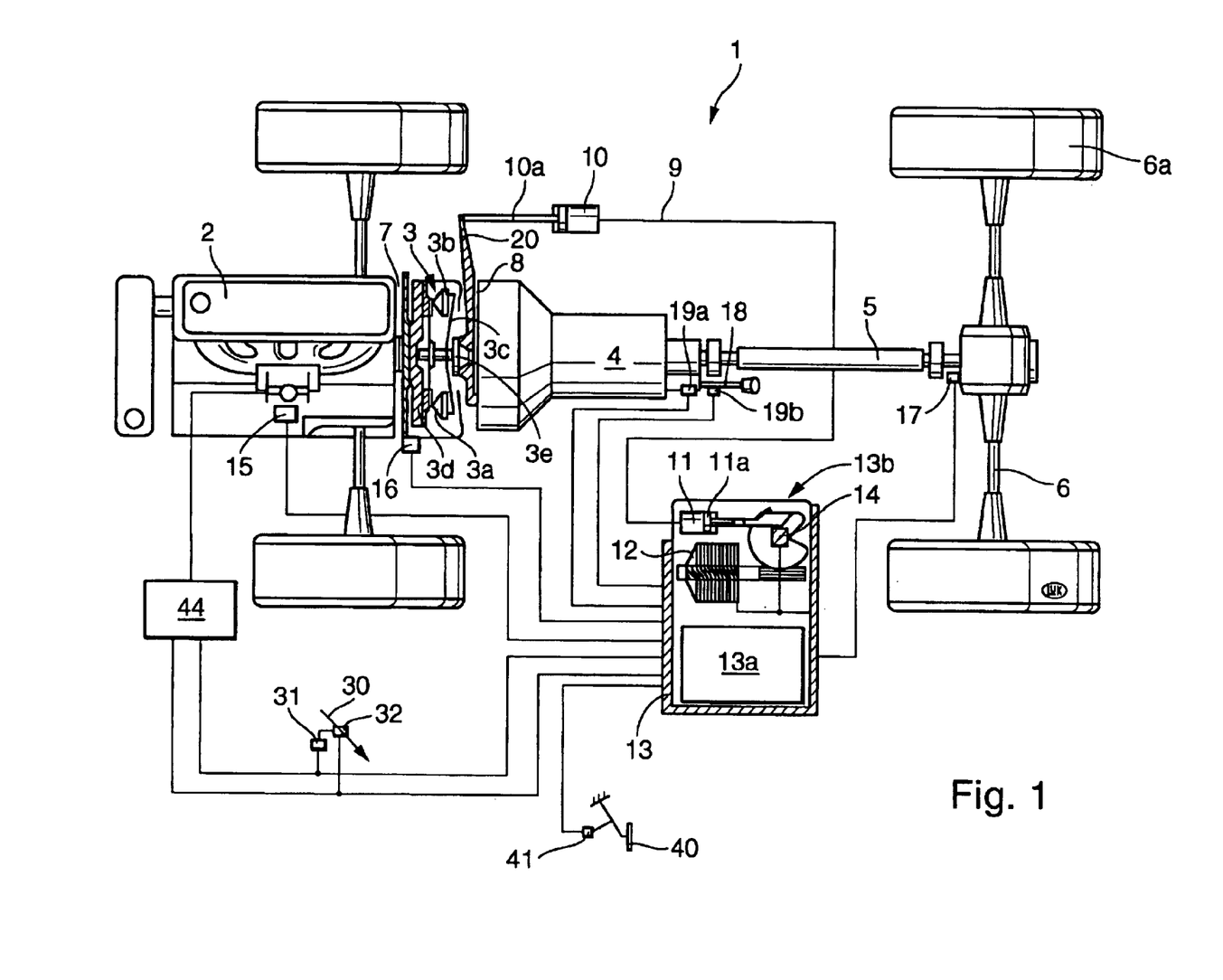
FIG. 1 shows a basic motor vehicle assembly.

In accordance with FIG. 1, a motor vehicle 1 has a drive unit 2, such as a motor or an internal combustion engine. Further, a torque transmitting system 3 and a transmission 4 are arranged in the drive train of the motor vehicle 1. In that exemplary embodiment the torque transmitting system 3 is arranged in the flow of power between the engine and the transmission, wherein a drive torque of the engine is transmitted by the torque transmitting system 3 to the transmission 4, and from the output side of transmission 4 to an output drive shaft 5 and to a downstream axle 6 as well as to the wheels 6a.

The torque transmitting system 3 includes a clutch, such as, for example, as a friction clutch, a multi-plate clutch, a magnetic particle clutch, or a torque converter lockup clutch, wherein the clutch can be a self-adjusting or a wear-compensating clutch. The transmission 4 is an uninterrupted-shift transmission (USG). In keeping with the inventive concept, the transmission can also be an automated-shift transmission (ASG), which can undergo automated shifting by means of at least one actuator. An automated-shift transmission is hereinafter to be understood as an automated transmission that is shifted with an interruption in tractive force, and in which the process of shifting the transmission ratio is carried out and implemented and controlled by at least one actuator.

Further, an automatic transmission can also be utilized as the USG, wherein an automatic transmission is a transmission that is substantially without interruption in tractive force during shifting processes, and which, as a rule, is designed as planetary gear stages.

Furthermore, a continuously variable transmission, such as a belt-driven, conical-pulley transmission, can also be used. The automatic transmission can also be designed with an output side torque transmitting system 3, such as a coupling or a friction clutch. The torque transmitting system 3 can further be designed as a start-up clutch and/or a reversible clutch for the reversal of the direction of rotation and/or a safety clutch with a specifically controllable, transmittable torque. The torque transmitting system 3 can be a dry friction clutch or a wet friction clutch, which runs, for example, in a fluid. It can also be a torque converter.

The torque transmitting system 3 has an input side 7 and an output side 8. Torque is transmitted from the input side 7 to the output side 8, in which, for example, the clutch disk 3a is supplied with power by means of the pressure plate 3b, the disc spring 3c, and the clutch release bearing 3e, as well as the flywheel 3d. In order to accomplish that power supply, the release lever 20 is actuated by means of an actuating device 10, for example an actuator.

The control of the torque transmitting system 3 is accomplished by means of a control unit 13, such as, for example, a control device that can include control electronics 13a and an actuator 13b. In another advantageous embodiment, the actuator 13b and the control electronics 13a can also be arranged in two different units, such as, for example, housings.

The control unit 13 can include the control and power electronics for controlling the drive motor 12 of the actuator 13b. In that way an advantageous result can be, for example, that the system requires one enclosure for the actuator 13b with electronics. The actuator 13b includes the drive motor 12, such as, for example, an electric motor, wherein the electric motor 12 acts upon a master cylinder 11 through a transmission, such as, for example, a worm gear drive, a spur gear drive, a crank drive, or a threaded spindle gear drive. That action upon the master cylinder 11 can be effected directly or through a rod.

The movement of the output part of the actuator 13b, such as, for example, the master cylinder piston 11a, is detected by a clutch travel sensor 14, which detects the position or orientation or rotational speed or acceleration of a value, in which the speed or acceleration is proportional to the respective position or the engagement position of the clutch. The master cylinder 11 is connected to the slave cylinder 10 by a pressure-medium conduit 9, such as, for example, a hydraulic conduit. The output element 10a of the slave cylinder is operatively connected with the release means 20, for example a release lever, so that a movement of the output element 10a of the slave cylinder 10 causes the release means 20 also to be moved or tipped, in order to control the torque that can be transmitted by the clutch 3.

The actuator 13b for controlling the transmittable torque from the torque transmitting system 3 can be actuated by a pressurized medium, that is, it can have a pressure-medium-actuated master and slave cylinder. The pressure medium can be, for example, a hydraulic fluid or a pneumatic medium. The actuation of the pressure-medium-actuated master cylinder can be accomplished electromotively, wherein the electric motor that is provided as the drive element 12 can be electronically controlled. In addition to an electromotive drive element, the drive element 12 of the actuator 13b can also be another type of drive element, for example a drive element actuated by a pressure medium. Further, magnetic actuators can also be used in order to adjust the position of an element.

In the case of a friction clutch, the control of the transmittable torque results when the contact pressure of the friction linings of the clutch disc between the flywheel 3d and the pressure plate 3b accurately takes place. Through the position of the release means 20, such as, for example, a release fork or a central release member, the force applied to the pressure plate 3b as well as to the friction linings can be precisely controlled, whereby the pressure plate 3b moves between two end positions and can be adjusted and established arbitrarily. One end position corresponds to a fully engaged clutch position, and the other end position corresponds to a fully disengaged clutch position. To control a transmittable torque, which for example is lower than the current engine torque, a position for the pressure plate 3b can be controlled, for example, which lies in an intermediate area between the two end positions. The clutch can be fixed in that position by means of the precise control of the release means 20. However, transmittable clutch torque values that clearly exceed the current engine torque, can also be controlled. In such a case, the currently-existing engine torque can be transmitted, wherein the torque irregularities in the drive train, for example in the form of torque peaks, are damped and/or isolated.

To control the torque transmitting system 3, further sensors are utilized, which at least some of the time monitor the relevant values for the entire system, and which supply the condition values, signals and measured values that are necessary for control purposes and are processed by the control unit, wherein a signal connection to other electronic units can be provided and can exist, such as, for example, to an engine electronic control unit 44 or an electronic unit of an anti-lock braking system (ABS) or an anti-slip regulator (ASR). The sensors detect, for example, rotational speeds, such as wheel rotational speeds, engine rotational speeds, the position of the load lever, the throttle valve position, the gear position of the transmission, a shift plan, and further motor-vehicle-specific characteristic values.

FIG. 1 shows that a throttle valve sensor 15, an engine rotational speed sensor 16, and a tachometer 17 can be utilized and can supply measured values or information to the control unit 13. The electronic unit, such as, for example, a computer unit, of the control electronics 13a processes the system input values and sends control signals to the actuator 13b.

The transmission is designed, for example, as a step-change transmission, wherein the transmission ratio steps are changed by means of a shift lever 18, or the transmission is actuated or operated by means of that shift lever 18. Further, at least one sensor 19b is arranged on the shift lever 18 of the manual transmission, which detects the intended shift and/or the gear position and transmits it to the control unit 13. The sensor 19a is linked to the transmission and detects the current gear position and/or the intended shift. The recognition of an intended shift utilizing at least one of the two sensors 19a, 19b can be accomplished in that the sensor is a force sensor that detects the force acting on the shift lever 18. Further, the sensor can also be configured as a displacement or position sensor, whereby the control unit recognizes an intended shift from the timewise change of the position signal.

The control unit 13 is in signal connection with all the sensors at least part of the time, and evaluates the sensor signals and system input values in such a way that, as a function of the current operating point, the control unit outputs the control or regulation commands to the at least one actuator 13b. The drive motor 12 of the actuator 13b, for example an electric motor, receives from the control unit, which controls the clutch actuation, an adjustment value that is a function of measured values and/or system input values and/or signals from the connected sensing mechanisms. To that end, a control program is implemented in the control unit 13, as hardware and/or as software, which evaluates the input signals and, utilizing comparisons and/or functions and/or performance characteristics, calculates or determines the output values.

In an advantageous way, the control unit 13 includes a torque-determining unit, a gear-position-determining unit, a slip-determining unit and/or an operating-condition-determining unit, or is in signal connection with at least one of those units. Those units can be implemented by control programs, as hardware and/or as software, so that by means of the input sensor signals the torque of the drive unit 2 of the motor vehicle 1, the gear position of the transmission 4, as well as the slip that exists in the area of the torque transmitting system 3, and the current operating state of the motor vehicle 1 can be determined.

Based upon the signals from the sensors 19a and 19b, the gear-position-determining unit ascertains the currently engaged gear. The sensors 19a, 19b are thereby linked to the shift lever and/or to internal transmission position means, such as, for example, a central selector shaft or shift rods, and detects them, for example the position and/or the rotational speed of those components. Furthermore, a load lever sensor 31 can be arranged on the load lever 30, such as, for example, on an accelerator pedal, which detects the position of the load lever. A further sensor 32 can function as an idle switch, that is, when the load lever 30 or accelerator pedal is actuated, that idle switch 32 is switched on, and when the load lever 30 is not actuated it is switched off, so that that digital information whether or not the load lever 30 is actuated can be recognized. The load lever sensor 31 detects the degree of actuation of the load lever 30.

FIG. 1 shows, in addition to the load lever 30 and the sensors connected to it, a brake actuation element 40 for actuating the service brake or the parking brake, such as, for example, a brake pedal, a hand brake lever, or a hand-or foot-operated actuation element of the parking brake. At least one sensor 41 is arranged on the actuation element 40 and monitors its actuation. The sensor 41 is designed, for example, as a digital sensor, such as, for example, as a switch, whereby it detects whether the brake actuation element 40 is actuated or not actuated. A signal arrangement, such as, for example, a brake light, can be in signal connection with the sensor 41, which signals that the brake is actuated. That can take place for both the service brake and the parking brake. However, the sensor 41 can also be designed as an analog sensor, whereby a sensor of that type, such as, for example, a potentiometer, ascertains the degree of actuation of the brake-actuation element 41. That sensor can also be in signal connection with a signal unit.

Figure 2:
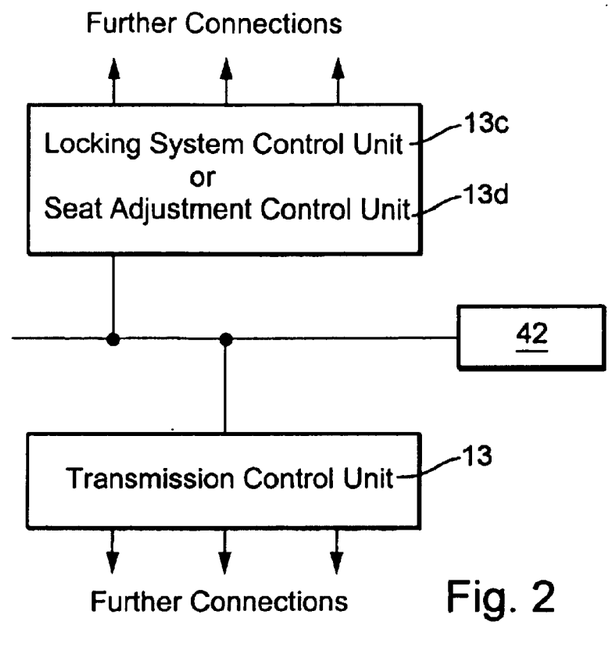
FIG. 2 shows the connection of the control units in accordance with the invention.
Figure 3:
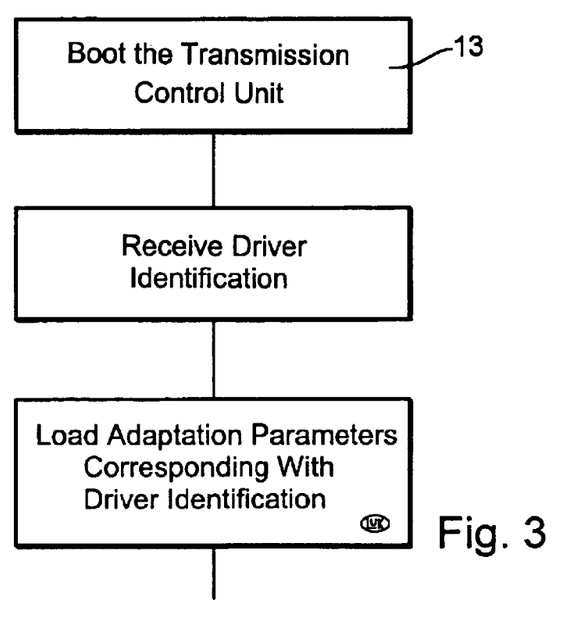
FIG. 3 shows the course of the initialization process.

From FIGS. 2 and 3 it is apparent how existing memory or identification functions are used in a motor vehicle in order to provide access to driver-specific data, especially shift characteristics or the like. Accordingly, the driver's individual shift characteristics can be associated with him as rapidly as possible.

FIG. 2 shows a connection to one another of the specific control units 13, 13c and 13d. When a driver wishes to enter his motor vehicle 1, there next occurs the identification of the driver by the lock recognition system. The control unit 13c for the locking system releases the latching device. At the same time, the data embedded for increasing comfort are retrieved from the memory-storage of the control unit 13d for seat adjustment, and the seat is correspondingly adjusted. Thus, as soon as a driver initiates the memory function in order, for example, to adjust his seat position, the previously-stored adaptation parameters for the control of the transmission can also be set. An additional signal, the so-called Driver ID, which provides information regarding the driver's driving style, is also supplied in the communication with the transmission control unit 13. A linking of the corresponding control units 13, 13c, and 13d is accomplished, for example, by the interface with the motor vehicle's CAN bus 42. Another, equally effective possibility of transmitting that Driver ID to the transmission control unit 13 is also possible.

In accordance with FIG. 3, following the boot process for the transmission control unit 13, the driver identification is received from the control unit of the locking system 13c or of the seat adjustment 13d. In accordance with the received values, the adaptation parameters for the transmission shift programs are then loaded into the transmission control unit 13. That is followed by the initialization or start-up process of the transmission control unit 13.

In that manner, at the same time an identification of the driver is made available to the transmission control unit 13. With that, the widest varieties of an adaptive transmission control can be influenced. For example, from the position of the shift characteristics the driving style of the driver can be deduced; for example whether he tends to shift up at lower rotational speeds, that is, whether he drives more economically or tends toward a more sporty driving style, in which the gears are drawn out as far as possible.

If, as the simplest variation, the transmission control system possesses merely various driving programs that can ordinarily be manually selected by the driver, then the simplest embodiment can consist of providing the driver with those adjustment variants that he selected the last time he drove, for example the sport mode, the winter mode, the economy mode, or some other possible driving mode.

The advancements described in FIGS. 2 and 3 can be preferred in motor vehicles having automatic or automated transmissions, as well as having adaptive shift strategies, for example, with double-clutch transmission systems (DKG), automated-shift transmission systems (ASG), or the like.

Figure 4:
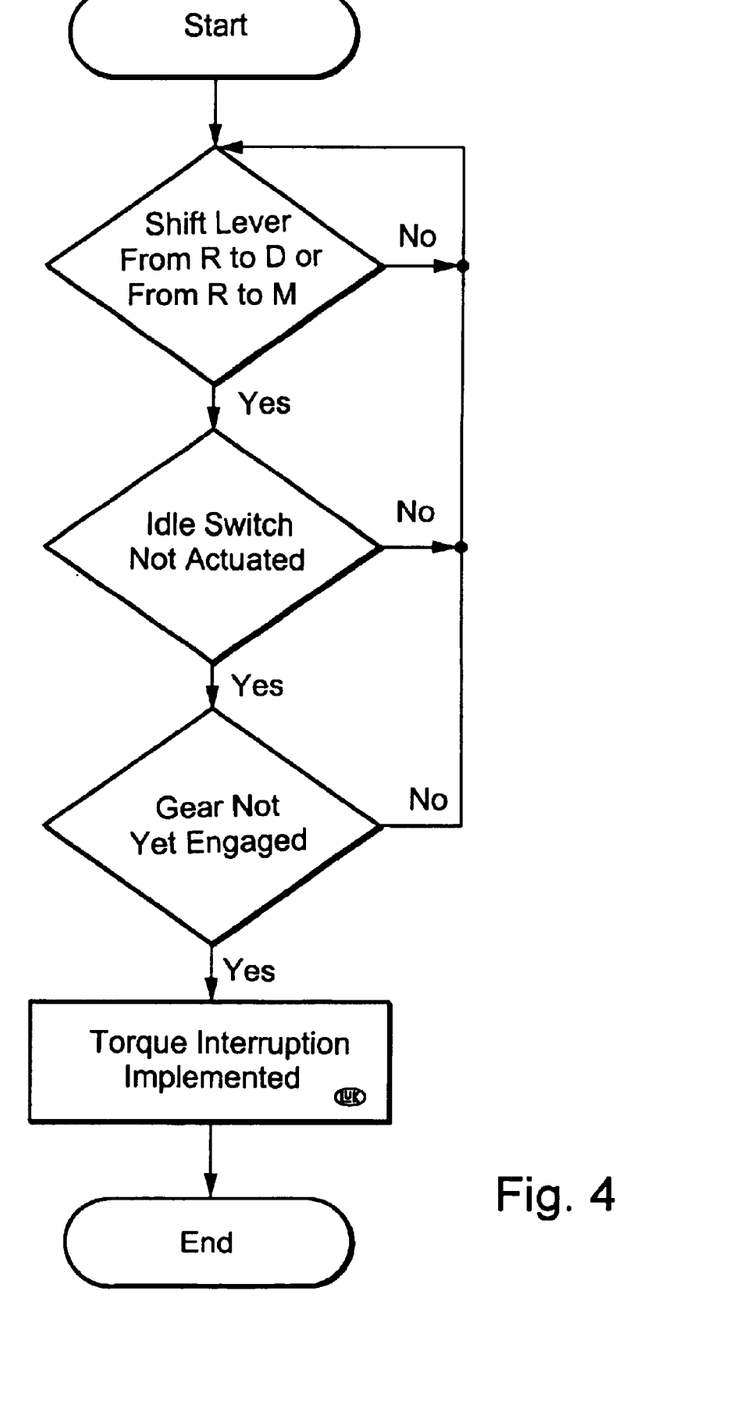
FIG. 4 shows a flow chart.

To increase driving comfort, a flow chart is shown in FIG. 4, illustrating the shift from reverse to a forward gear in a motor vehicle having an automated or automatic shift transmission. The disadvantage of pitching movements, which occur with those transmissions in contrast to a manual-shift transmission due to the longer duration of the gear change, is prevented by the revving of the engine.

In addition, it is important that the current parameters of the motor vehicle 1 with respect to the clutch 3 and the transmission 4 are recognized and accepted by the transmission control unit 13, and therewith automatically initiate or reject corresponding countermeasures.

The following conditions must be fulfilled for situation recognition:

Shift of the selection lever from "R" (Reverse) to "D" (Drive) or "R" to "M" (Manual)

The idle switch "LL" is not actuated (but the driver is already stepping on the gas)

The forward gear has not yet been engaged.

If the transmission control unit has accepted the parameters, an interruption in torque automatically follows in the transmission control system through the CAN bus 42, that is, the maximum engine torque is regulated downward to a value that is less than 10 Nm. In that manner, an excessive rotational speed difference between the motor and the transmission is prevented, so that the engine cannot rev. That produces the desired advantage that the jolting during engagement of the clutch is eliminated, and the shifting of gears can then be implemented via the transmission actuator 13b.

Figure 5:
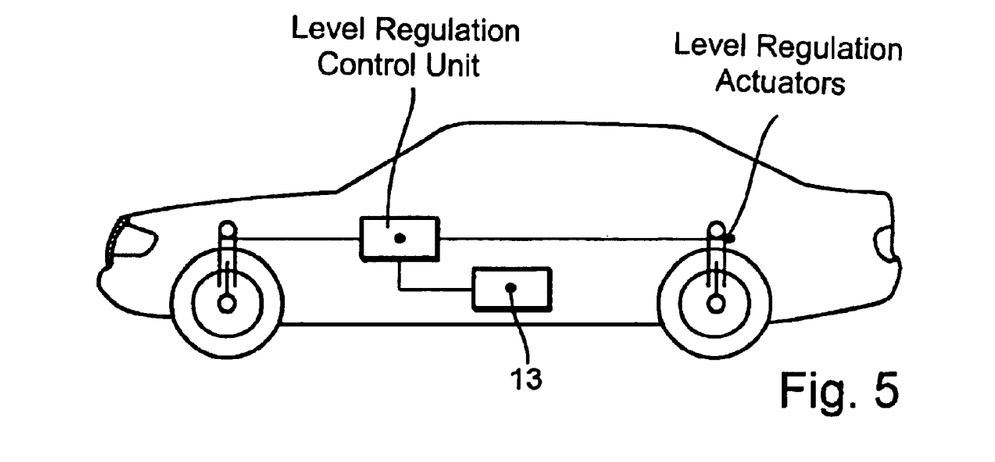
FIG. 5 shows the linking of transmission control and level control.
Figure 6:
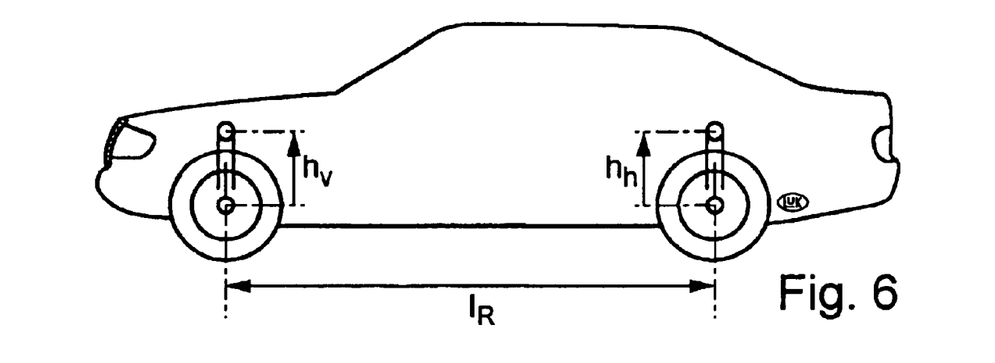
FIG. 6 shows definition of the pitching angle means.

To further increase driving comfort, the chassis is also included, as is illustrated in FIGS. 5 and 6. In particular, the pitching movements that occur during shifting and during the engagement/disengagement procedure of the clutch, which are defined by the pitching angle, $$\alpha = \frac{h_v - h_h}{l_R},$$

can be prevented or reduced. To that end, for example, an appropriate signal corresponding to the current situation is transmitted in a timely manner to the control or regulation of the actuators of the active chassis, in order to positively influence the regulation of the active chassis. For example, the coordination of the level control of the chassis can advantageously be carried out as a function of the engagement/disengagement of the clutch and the shift process.

Figure 7:
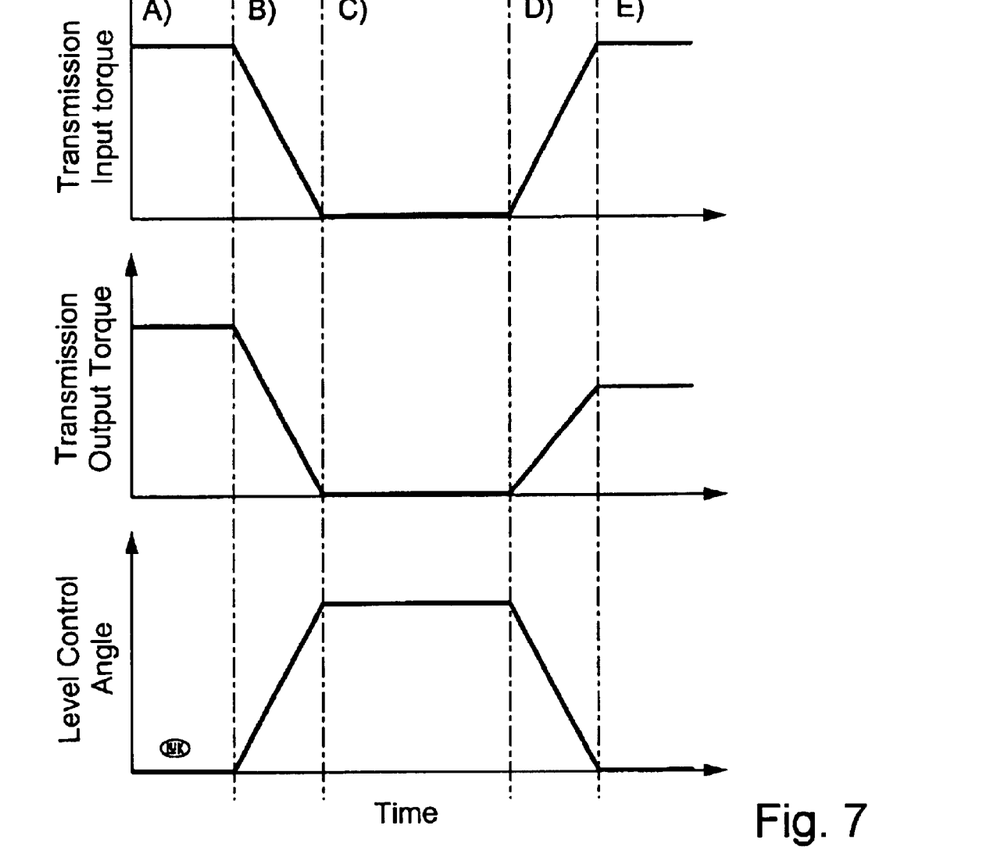
FIG. 7 shows active influencing of the pitching angle by a level regulation during the shift process.

The influencing of the pitching angle α by a level control of the chassis during a shift process is illustrated in FIG. 7. In it signify:

A—Driving in the old gear
B—Torque reduction
C—Interruption in tractive force during a gear change
D—Torque build-up
E—Driving in the new gear As can be seen from the diagrams, the actuation of the chassis in the region of maximum delay during the shift process is reduced by the dynamic "raising" of the motor vehicle, which leads to a pitching movement of the driver due to his inertia.

Figure 8:
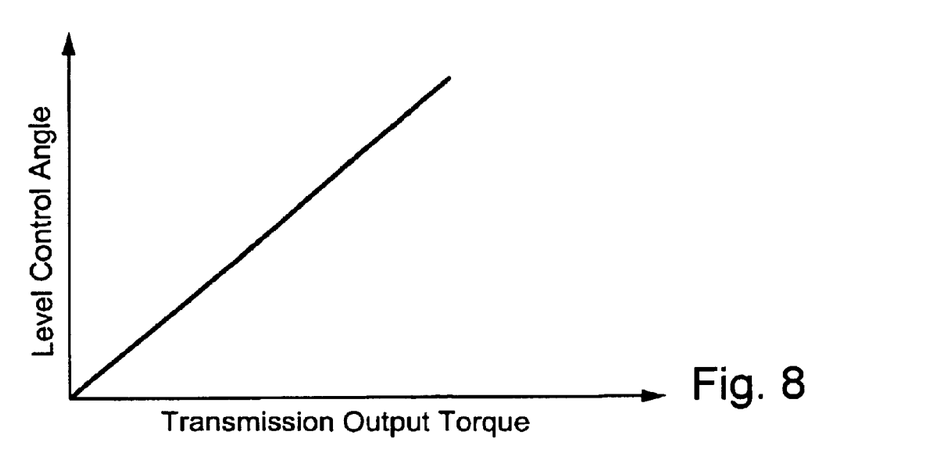
FIG. 8 shows the interrelation between the pitching angle preset as a function of the value of the transmission output torque.

FIG. 8 shows the relationship between the pitching angle point that results from the transmission control on the level control of the chassis as a function of the value of the transmission output torque.

The claims included in the application are illustrative and are without prejudice to acquiring wider patent protection. The applicant reserves the right to claim additional combinations of features disclosed in the specification and/or drawings.

Because advantageous improvements can be formed as autonomous and independent inventions with regard to the state of the art on the priority date, the applicants reserve the right to make them the subject of dependent and/or independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations, and/or materials, which, for example, are inventive by combining or modifying single features that are in combination and are described individually in relation to the general specification and embodiments, as well as the claims, and shown in the drawings, as well as elements or method steps that can be derived by a person skilled in the art in the light of the disclosed solutions of the problem, and which by means of combined features lead to a new object or new method steps or sequences of method steps, as well as manufacturing, testing and operational procedures.

What is claimed is:

1. A method for operating a motor vehicle having a driving engine and an automated or automatic transmission in a drive train for transmitting a torque, said method comprising the steps of: providing a transmission control unit including a memory function and operable to control a shift of gears within the transmission, controlling a clutch engagement/disengagement process to improve riding comfort during a shift of gears from R to D by momentary engagement of engine torque before a shift of gears takes place by means of a transmission actuator.

2. A method in accordance with claim 1, including the step of providing a driver-identifying lock recognition system that includes driver-specific parameters for controlling vehicle operation in accordance with predetermined driver-related vehicle operation characteristics.

3. A method in accordance with claim 1, including the step of changing engine torque by means of the transmission control unit that is regulated by a CAN bus.

4. A method in accordance with claim 1, wherein the engine torque is less than 10 Nm before the gear shift.

5. A method in accordance with claim 1, including the step of utilizing at least one of the memory function of the transmission control unit and a driver-identifying lock system to balance relevant adaptation parameters in the control unit.

6. A method in accordance with claim 1, including the step of establishing an additional signal during communication with the transmission control unit to identify the corresponding driver.

7. A method in accordance with claim 1, including the step of inputting adaptation parameters for a transmission shift program following a boot process of the transmission control unit and the identification of the driver.

8. A method in accordance with claim 1, wherein the linking of the signals from the control unit takes place through a CAN bus of the motor vehicle.

9. A method in accordance with claim 1, including the step of detecting in a chassis level regulation control unit for level control of a chassis data received from level control actuators, and correlating the level control actuator data with the transmission control unit to control vehicle pitch angle.

10. A method in accordance with claim 9, wherein a level control of the chassis takes place as a function of clutch engagement/disengagement and transmission shift processes.

11. Apparatus for operating a motor vehicle having a driving engine and an automated or automatic transmission in a drive train for transmitting a torque, said apparatus comprising: a control unit including a memory function, wherein the control unit is operable to control operation of a clutch and a shift of gears within the transmission to provide a clutch engagement/disengagement process to improve riding comfort during a shift of gears from R to D by momentary engagement of engine torque before a shift of gears takes place, and a transmission actuator operatively connected with the transmission control unit for shifting gears.

12. Apparatus in accordance with claim 11, including vehicle leveling actuators arranged in at least one of a forward and a rear axle of the motor vehicle, wherein the leveling actuators are parallel to respective chassis-mounted shock absorbers.

13. Apparatus in accordance with claim 12, wherein during a control process regulating distances of the leveling actuators of an axle are regulated individually for each wheel of the vehicle.

14. Apparatus in accordance with claim 11, including a driver identification system for accessing driver-specific vehicle operating parameters for controlling vehicle operation and transmission gear shifts.

15. Apparatus in accordance with claim 11, including vehicle leveling actuators arranged in at least one of a forward and a rear axle of the motor vehicle, wherein the leveling actuators are components of shock absorbers.

* * * * *